United States Patent
Lucas et al.

(10) Patent No.: US 9,546,660 B2
(45) Date of Patent: Jan. 17, 2017

(54) COMPRESSOR SYSTEM WITH RESONATOR

(71) Applicant: Ingersoll-Rand Company, Davidson, NC (US)

(72) Inventors: Michael John Lucas, Mooresville, NC (US); Amin W. Haghjoo, St. Augustin (DE)

(73) Assignee: Ingersoll-Rand Company, Davidson, NC (US)

( * ) Notice: Subject to any disclaimer, the term of this patent is extended or adjusted under 35 U.S.C. 154(b) by 35 days.

(21) Appl. No.: 14/293,886

(22) Filed: Jun. 2, 2014

(65) Prior Publication Data
US 2015/0345497 A1    Dec. 3, 2015

(51) Int. Cl.
| | |
|---|---|
| *F01C 13/00* | (2006.01) |
| *F03C 2/00* | (2006.01) |
| *F03C 4/00* | (2006.01) |
| *F04C 2/00* | (2006.01) |
| *F04C 29/06* | (2006.01) |
| *F04C 18/10* | (2006.01) |
| *F04C 15/00* | (2006.01) |
| *F04C 2/16* | (2006.01) |
| *F04C 18/16* | (2006.01) |
| *F04D 29/66* | (2006.01) |

(Continued)

(52) U.S. Cl.
CPC ......... *F04C 29/065* (2013.01); *F04B 39/0027* (2013.01); *F04C 2/16* (2013.01); *F04C 15/0049* (2013.01); *F04C 18/10* (2013.01); *F04C 18/16* (2013.01); *F04C 29/061* (2013.01); *F04D 29/665* (2013.01); *F16L 55/033* (2013.01); *F16L 55/02781* (2013.01)

(58) Field of Classification Search
CPC ... F04C 29/061; F04C 29/063; F04C 15/0049; F04C 18/16; F04C 2/16; F04C 18/10; F04D 29/665; F04B 39/0027; F16L 55/02781; F16L 55/033
USPC .................................. 418/181, 201.1, 206.1
See application file for complete search history.

(56) References Cited

U.S. PATENT DOCUMENTS

| 4,927,342 A | 5/1990 | Kim et al. |
|---|---|---|
| 4,944,362 A | 7/1990 | Motsinger et al. |

(Continued)

FOREIGN PATENT DOCUMENTS

| DE | 102011002869 | 7/2012 |
|---|---|---|
| EP | 1291570 | 12/2003 |

(Continued)

OTHER PUBLICATIONS

European Patent Office, Extended Search Report issued in corresponding Application No. 15172280.9, dated Oct. 27, 2015.

*Primary Examiner* — Theresa Trieu
(74) *Attorney, Agent, or Firm* — Taft Stettinius & Hollister LLP

(57) ABSTRACT

In one form, a compressor system includes a compressor, and an annular ring disposed downstream of the compressor and structured to reduce pressure fluctuations in the pressurized air discharged by the compressor. The annular ring may include an internal passage for conducting the pressurized air. The annular ring may include at least one resonator in fluid communication with the internal passage. Further embodiments, forms, features, aspects, benefits, and advantages of the present application will become apparent from the description and figures provided herewith.

19 Claims, 4 Drawing Sheets

(51) Int. Cl.
*F04B 39/00* (2006.01)
*F16L 55/033* (2006.01)
*F16L 55/027* (2006.01)

(56) References Cited

U.S. PATENT DOCUMENTS

| | | | |
|---|---|---|---|
| 5,957,664 A | 9/1999 | Stolz et al. | |
| 6,331,103 B1 * | 12/2001 | Teraoka | F04C 29/061 418/181 |
| 6,684,842 B1 | 2/2004 | Hellie et al. | |
| 7,055,484 B2 | 6/2006 | Marks et al. | |
| 8,127,546 B2 | 3/2012 | Park | |
| 8,328,532 B2 * | 12/2012 | Sishtla | F04C 29/063 417/312 |
| 8,459,963 B2 | 6/2013 | Pileski | |
| 8,469,141 B2 | 6/2013 | Wang et al. | |
| 2006/0065478 A1 | 3/2006 | Rockwell | |
| 2011/0073406 A1 * | 3/2011 | Ortman | F02B 33/44 181/276 |
| 2012/0171069 A1 | 7/2012 | Huang et al. | |

FOREIGN PATENT DOCUMENTS

| | | |
|---|---|---|
| EP | 2495426 | 5/2012 |
| WO | 2014051937 | 3/2014 |

* cited by examiner

COMPRESSOR SYSTEM WITH RESONATOR

FIELD OF THE INVENTION

The present invention relates to compressor systems, and more particularly, to compressor systems with noise reduction.

BACKGROUND

Systems that effectively reduce the amplitudes of pressure waves in the pressurized air discharged by a compressor remain an area of interest. Such pressure waves may include aerodynamic pressure and aeroacoustic pressure. Some existing systems have various shortcomings, drawbacks, and disadvantages relative to certain applications. Accordingly, there remains a need for further contributions in this area of technology.

SUMMARY

In one form, a compressor system includes a compressor, and an annular ring disposed downstream of the compressor and structured to reduce pressure fluctuations in the pressurized air discharged by the compressor. The annular ring may include an internal passage for conducting the pressurized air. The annular ring may include at least one resonator in fluid communication with the internal passage. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
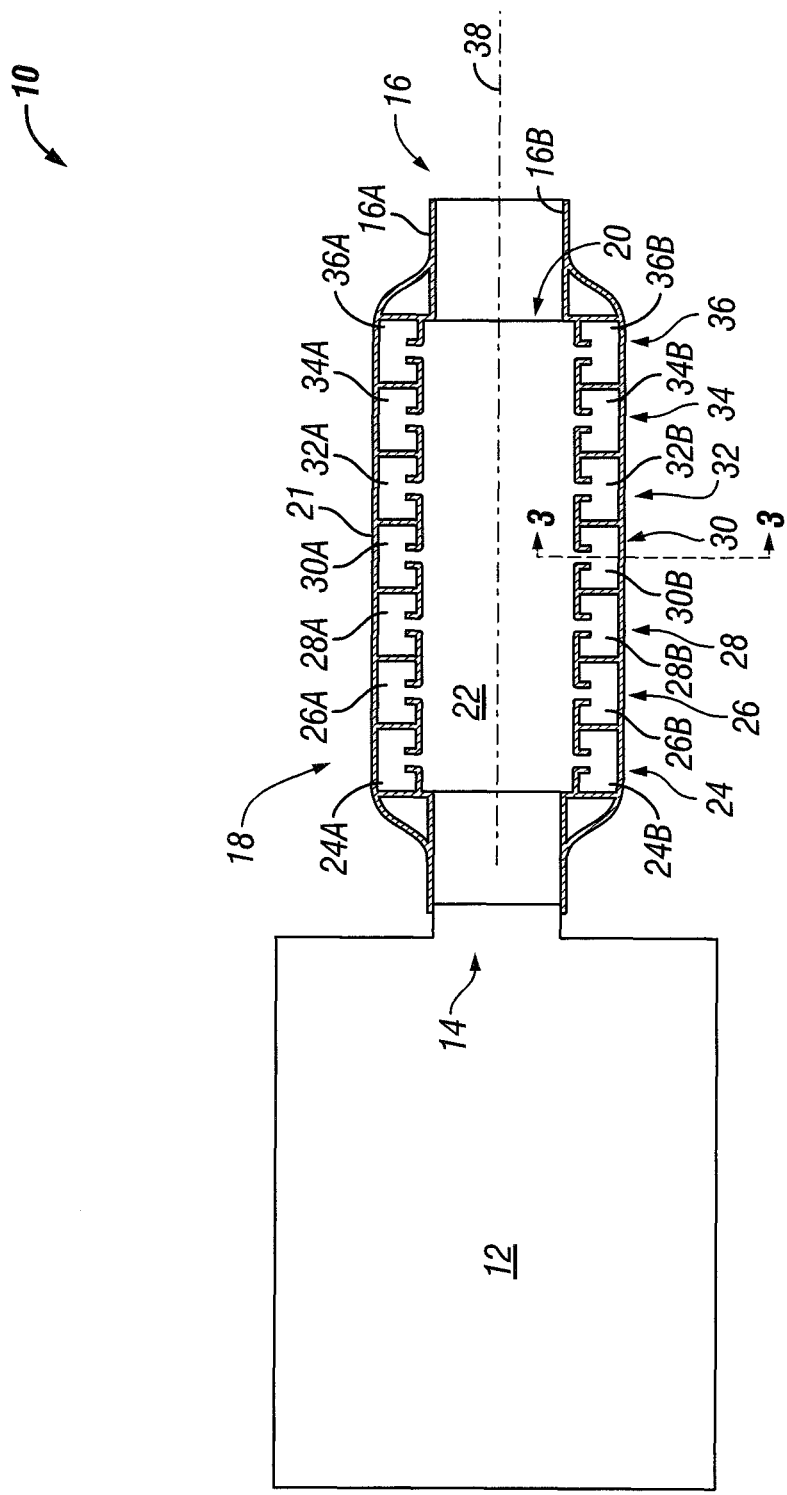
FIG. 1 schematically illustrates some aspects of a non-limiting example of a resonator in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a compressor system 10 are depicted in accordance with an embodiment of the present disclosure. Compressor system 10 includes a compressor 12 having a discharge portion 14, and a discharge pipe 16 in fluid communication with the compressor 12 for conducting the pressurized air from the compressor 12 toward a desired location, e.g., to or toward one or more downstream components (not shown) that employ pressurized air. In one form, the discharge pipe 16 is integral with the compressor 12, although in other embodiments, the discharge pipe 16 may be a discrete component attached to or otherwise coupled or affixed to the compressor 12, directly or indirectly. The discharge pipe 16 includes an outer surface 16A and an internal pipe passage 16B. In one form, the compressor 12 is a screw compressor. In a particular form, the compressor 12 is an oil-free screw compressor. In other embodiments, the compressor 12 may be a piston compressor, a lobed compressor, or any positive displacement compressor. In still other embodiments, the compressor 12 may be a centrifugal compressor or another type of compressor. The compressor 12 is configured to discharge pressurized air via the discharge portion 14 and through the discharge pipe 16 to a desired location.

During normal operation, compressor 12 pressurizes gas, such as ambient air, and discharges the pressurized gas for use by the downstream components. In some operating conditions, the compressor 12 may produce pressure pulsations, which may be a significant or primary source of noise generated from the compressor 12. The generation of sound may be either from structural vibration or from aerodynamically unsteady flow. The latter, referred to as aeroacoustic, is the result of unsteady flow fields that radiate sound into the far field. The aeroacoustic field includes two kinds of pressure: pressure due to the aerodynamic forces and pressure due to the acoustic field that radiates from the existence of the aerodynamic flow. Aerodynamic pressure is created by a pressure field that is the result of the transfer of mass, such as the pressurized gas discharged from the compressor 12. Acoustic pressure is created as the acoustic field transfers vibration as a longitudinal wave without the transfer of mass. Though generally the dominant pressure field is the aerodynamic pressure, both pressure fields exist and contribute to the resulting dynamic pressure and, thereby, the sound generated by the compressor 12.

Untreated, the amplitudes of the pulsations from the compressor 12 may cause harm to downstream piping and other components, and/or may cause undesirable noise levels. For example, a typical oil-free screw compressor rated for 100 pounds per square inch gauge (psig) may have a dynamic pressure at the compressor discharge with a peak-to-peak amplitude that ranges between about 80 psig and about 120 psig. For a screw compressor, the fundamental frequency of oscillation is a port passing frequency at the discharge of the compressor. The port passing frequency represents the number of times the compressor discharge port is opened to allow compressed air to escape into the discharge pipe 16. It is desirable to reduce the pressure pulsations to amplitudes that are acceptable for both system reliability and noise constraints. Accordingly, embodiments of the present invention include a silencer 18 disposed within the discharge pipe 16. In some embodiments, the silencer 18 may be formed integrally with the discharge pipe 16, whereas in other embodiments, silencer 18 may be fitted within the discharge pipe 16 to form an acoustically absorptive liner within the discharge pipe 16.

In at least one embodiment of the present disclosure, the silencer 18 includes an annular ring 20 disposed within the discharge pipe 16. The annular ring 20 includes an internal passage 22 structured to enable the pressurized air from the compressor 12 to flow therethrough to downstream components via the discharge pipe 16. In some embodiments, the internal passage 22 defines all or a portion of the internal pipe passage 16B. The annular ring 20 may include a plurality of resonators 21 in fluid communication with the internal passage 22. Each resonator 21 in the annular ring 20 is structured to reduce pressure fluctuations in the pressurized air discharged by compressor 12 and effectively dampen, attenuate, or absorb acoustic pressure waves at one or more desired frequencies, in whole or in part.

In one form, the annular ring 20 includes a plurality of circumferential rows 24-36 of resonators 21, wherein each circumferential row of resonators 21 includes a plurality of resonators 21 that are circumferentially spaced apart, i.e., spaced apart about or around the circumference of a particular circumferential row of the annular ring 20. In one form, each circumferential row of resonators 21 is adjacent to the next, though it will be understood that the annular ring 20 is not limited to a particular scheme of spacing the circumferential rows 24-36 of resonators 21 relative to each other. In the depiction of FIG. 1, because the annular ring 20 is illustrated in cross-section, only two resonators 21 for each circumferential row 24-36 are illustrated, i.e., resonators 24A, 24B through 36A, 36B. Nonetheless, each circumferential row 24-36 may include any number of resonators 21, and the illustrated embodiment includes more than two resonators 21 per row. In the illustrated embodiment, the annular ring 20 includes twelve resonators 21 per row, specifically, resonators 24A-24L for circumferential row 24, although only two, resonators 24A and 24B are illustrated in FIG. 1. Further, though seven rows (24, 26, 28, 30, 34 and 36) are depicted, it will be understood that the annular ring 20 may include any number of circumferential rows having any number of resonators 21 per circumferential row. Moreover, in many applications each circumferential row may include a different number of resonators 21 than one or more other circumferential rows. In such an embodiment, the resonators 21 may be of different sizes within a given row and thus have different pressure absorption or canceling capacity from row to row as described further herein. Though FIG. 1 illustrates resonators 21 having the same size, it will be understood that FIG. 1 is merely illustrative in nature, and that the number and the size of the resonators 21 may vary from location to location within the annular ring 20.

Figure 2:
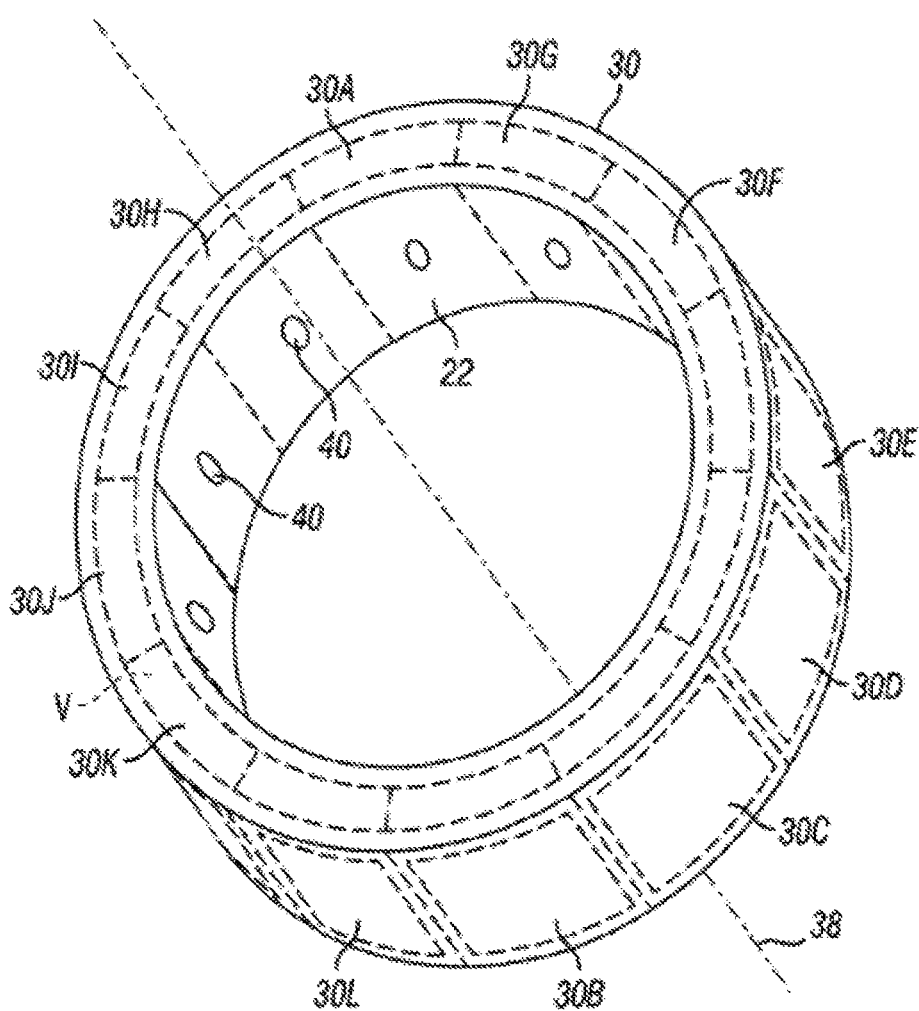
FIG. 2 is an isometric view illustrating some aspects of a non-limiting example of a circumferential row of resonators in accordance with an embodiment of the present invention.

For purposes of description, each circumferential row of resonators 21 may be referred to as a ringlet, such that a plurality of rows or ringlets, e.g., rows/ringlets 24-36, form the annular ring 20. Referring to FIG. 2, some aspects of a non-limiting example of an individual circumferential row or ringlet of resonators 21 are depicted in accordance with an embodiment of the present disclosure. In FIG. 2, a single ringlet 30 having a plurality of resonators 21 is illustrated. The ringlet 30 includes a plurality of resonator openings 40 that are exposed to the internal passage 22 for attenuating and absorbing sound via the resonators 21. In one form, each resonator 21 includes a single opening 40, although it will be understood that in other embodiments an individual resonator 21 may include more than one opening 40. As shown in FIG. 2, a circumferential ringlet 30 may include twelve resonators 30A-30L (shown in dashed lines). It will be understood that a given ringlet 30 may include any number of resonators 21 depending upon, for example, the acoustic frequency or frequencies sought to be attenuated or absorbed by the particular resonator or resonators 21 of a particular ringlet 30. In some embodiments, all of the resonators 21 in a particular circumferential row or ringlet 30 may be structured to attenuate and/or absorb the same frequency, whereas all of the resonators 21 in another circumferential row or ringlet, for example the resonators 24A-24L of row 24, may be structured to attenuating and absorb a different frequency. In some embodiments, the resonators 21 in a particular circumferential row or ringlet may be structured to attenuate and/or absorb one or more different frequencies.

Figure 3:
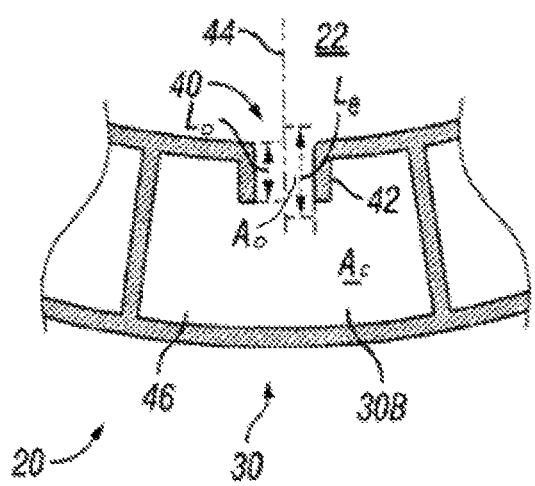
FIG. 3 is a sectional view illustrating some aspects of a non-limiting example of a resonator in accordance with an embodiment of the present invention.

Referring to FIG. 3, some aspects of a non-limiting example of the resonator 30B are depicted in accordance with an embodiment of the present disclosure. As set forth above, in the depicted embodiment, the annular ring 20 includes a plurality of circumferential rows or ringlets, each having a plurality resonators 21 similar in nature to resonator 30B. The resonator 30B, and each resonator 21, may include a neck 42 having a centerline 44, the neck 42 extending opposite the internal passage 22 from a surface adjacent the internal passage 22. The neck 42 further defines the opening or orifice 40 such that the neck 42 may extend from the perimeter of the orifice 40. The orifice 40 may be circular, polygonal, oblong (e.g., a slit) or any suitable shape. Accordingly, the orifice 40 may have an effective cross-sectional area or size $A_o$. The neck 42 has an actual length $L_o$. The resonator 30B includes a cavity 46 having a volume V and an area $A_c$, where the area $A_c$ is defined as the cross-sectional area of the cavity 46 perpendicular to centerline 44. The cavity 46 is in communication with the internal passage 22 via the neck 42 and the orifice 40. The orifice size $A_o$, the neck length $L_o$, the volume V, the area $A_c$, and/or one or more other physical parameters, pertaining to the size, shape, and/or orientation of the neck 42 or cavity 46, may vary as between resonators and/or as needed for the particular application. In one form, the orifice size $A_o$ and the length $L_o$ of the neck 42, and the volume V and the area $A_c$ of the cavity 46, may be selected to enable a desired response from each particular resonator 21. For example, the physical parameters of each resonator 21 may be selected to tune the resonator 21 to effectively dampening, attenuate, or absorb a desired acoustic wave frequency, to reduce or eliminate the amplitude of acoustic pressure waves at such desired frequency in the internal passage 22.

In one form, each of resonators 24A-24L through 36A-36L may be tuned or configured to reduce the amplitude of an acoustic wave at a desired frequency F. In one form, the resonator 30B may be tuned or configured by selecting or varying the values of the orifice size $A_o$ and/or the length $L_o$ of the neck 42, and/or the volume V and/or the area $A_c$ for the cavity 46, to produce a resonator natural frequency $F_n$, as calculated by:

$$F_n = \frac{c}{2\pi} \sqrt{\left(\frac{A_o}{V \cdot L_e}\right)}, \quad \text{(Equation 1)}$$

where $$L_e = L_o + 0.48 \cdot \sqrt{A_o} \cdot \left[2 - 1.25\sqrt{\left(\frac{A_o}{A_c}\right)}\right], \quad \text{(Equation 2)}$$

wherein c is the speed of sound at the local air density; $A_o$ is the effective orifice size (i.e., cross-sectional area) of the neck 42; $L_o$ is the actual length of the neck 42; V is the volume of the cavity 46; $A_c$ is the cross-sectional area of cavity 46; $L_e$ is the effective neck length as described herein; and $F_n$ is the natural frequency of the resonator 30B.

A pressure wave incident upon the orifice 40 having a frequency at the natural frequency Fn of the resonator 30B will largely be reflected back to the source, creating an interference that attenuates and/or cancels the incident pressure wave. The attenuation of incident pressure waves may be quantified as a transmission loss produced by the resonator 30B. The plurality of resonators 21, including the resonator 30B, of the annular ring 20 may be tuned accordingly to the attenuate and/or cancel the acoustic pressure waves generated by the compressor 12.

In one form, the resonators 21, like the resonator 30B, are Helmholtz resonators and function to attenuate and absorb acoustic pressure waves at one or more desired or predetermined frequencies. A Helmholtz resonator may be modeled as a simple oscillator in which the effective spring constant is determined by the compliance of the fluid in the cavity and its boundaries. In this framework, the effective oscillator mass is the fluid (i.e., air) mass in the resonator neck 42 plus the entrained fluid (i.e., air) mass from within the cavity 46 and from the internal passage 22. The entrained air mass may be modeled as the reactive radiating loading on two virtual pistons forming the boundaries between the neck 42 and, respectively, the cavity 46 and the internal passage 22.

The oscillation is generated by pressure waves, both aerodynamic and acoustic, incident upon the orifice 40 as the pressurized gas is discharged from the compressor 12 through the internal passage 22 of the silencer 18. The sloshing of the air through the orifice 40 as the air in the cavity 46 is alternately compressed and decompressed by incident pressure waves entrains a mass of air corresponding to orifice size $A_o$, multiplied by the neck length $L_o$, plus the entrained air outside the cavity. Because it is in motion, the entrained air mass moving through the orifice 40 has momentum that yields an effective neck length $L_e$ that is larger than the actual neck length, $L_o$. Consequently, the natural frequency of the resonator $F_n$ is dependent on the effective neck length $L_e$, which depends on the overall dimensions of the resonator 30B, in addition to the actual neck length 42. Further, the natural frequency $F_n$ of the resonator 30B may be broadened due to varying angles of incidence of the pressure waves on the orifice 40 caused by the shorter wavelengths of the aeroacoustic field and larger scale turbulence in flow of air through the internal passage 22.

Accordingly, the annular ring 20 dampens, attenuates, and absorbs both aerodynamic and acoustic pressure waves. In one aspect as shown in FIG. 1, the compartmentalized structure of the annular ring 20 comprised of the plurality resonators 21 lends compliance to the walls of the silencer 18 enabling the annular ring 20 to attenuate and absorb pressure waves pulsations in the aerodynamic pressure field. In another aspect of the annular ring 20, the plurality of resonators 21 may be tuned to attenuate the various frequencies in the acoustic field generated by the compressor 12 as described herein. Further, because the annular ring 20 of the silencer 18 may be disposed within the discharge pipe 16, the annular ruing 20 and the resonators 21 must be structured withstand the dynamic pressure of the aeroacoustic field, but not the full static pressure discharged by the compressor 12. By reducing or eliminating undesirable aerodynamic and acoustic pressure waves, noise may be reduced, and potential harm to compressor system 12 and/or downstream components may be abated or eliminated.

In one form, the annular ring 20 and the discharge pipe 16 are disposed about a centerline 38 as shown in FIG. 1, and in one form, are essentially cylindrical, or circular in cross-section. In other embodiments, the annular ring 20 and/or the discharge pipe 16 may have other shapes. In at least one embodiment, the annular ring 20 may be formed of a plurality of separate circumferential rows 24-36 that are assembled, stacked, and/or affixed to each other. Alternatively, the circumferential rows 24-36 of resonators 21 of the annular ring 20 may be formed as an integral, unitary structure.

Figure 4:
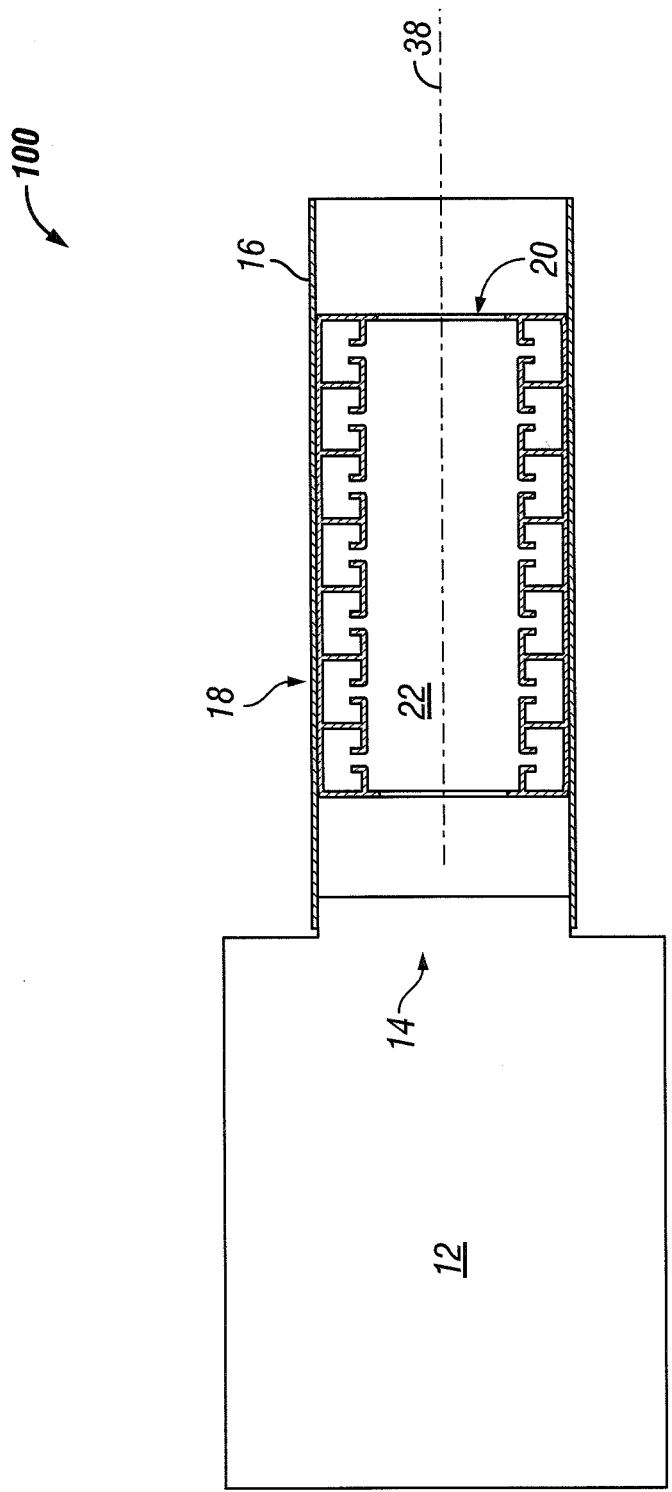
FIG. 4 is a sectional view illustrating some aspects of a non-limiting example of a resonator in accordance with an embodiment of the present invention.

In at least one embodiment according to the present disclosure, the silencer 18, the annular ring 20, and the circumferential rows 24-36 of resonators 21 may be formed as an integral, unitary structure that is separate from the discharge pipe 16 to form an acoustically absorptive liner, which can be inserted within and fitted to the discharge pipe 16 as shown in FIG. 4. In such an embodiment, a compressor system 100 may include the compressor 12 having the discharge portion 14 connected to the discharge pipe 16. The compressor system 100 may further include the silencer 18, including the annular ring 20, inserted within and supported by the discharge pipe 16. Depending on the compressed gas pressure generated by the compressor 12, the discharge pipe 16 may be exposed to significant stress due to the pressure difference between the relatively high pressure within the internal passage 22 and the relatively low ambient pressure surrounding the discharge pipe 16. Consequently, the discharge pipe 16 requires sufficient strength to withstand this pressure difference, which may be on the order of hundreds, or thousands, of pounds per square inch. Because the silencer 18 of the compressor system 100 is fitted within and supported by the discharge pipe 16, the silencer 18 does not need the structural strength to withstand the same pressure difference. Thus, the discharge pipe 16 provides structural integrity to the silencer 18, which is configured for sound attenuation.

Figure 5:
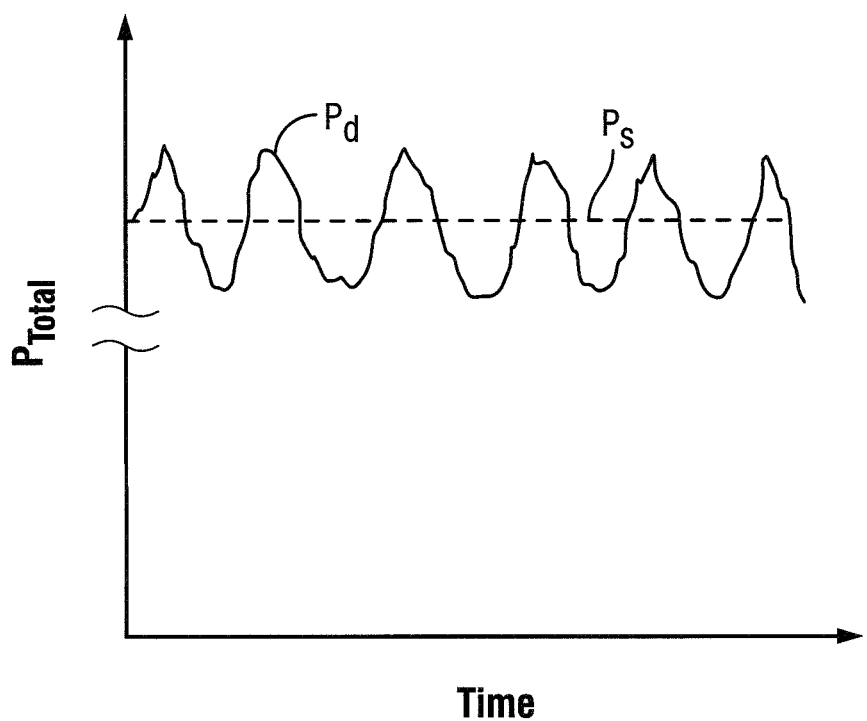
FIG. 5 is a graph illustrating total pressure over time for a non-limiting example of a resonator in accordance with an embodiment of the present invention.

The total pressure generated by the compressor 12 includes both a dynamic pressure resulting from the aerodynamically unsteady flow emanating from the discharge portion 14 and a static pressure resulting from the compression process as shown in Equation 3:

$$P_T = P_d + P_s \quad \text{(Equation 3)}$$

where $P_T$ is the total pressure, $P_d$ is the dynamic pressure, and $P_s$ is the static pressure. FIG. 5 illustrates the variation of the total pressure $P_T$ generated by the compressor 12 over a given period of time according to Equation 3. As depicted in FIG. 5, the dynamic pressure $P_d$ may vary as pressure waves move through the aeroacoustic field due to fluctuations from the aerodynamically unsteady flow as described herein. However, the static pressure generally remains relatively constant at a given operating condition of the compressor 12. Further, the fluctuations in dynamic pressure $P_d$ are relatively small in magnitude compared to the static pressure $P_s$, which is many magnitudes greater and on the order of hundreds, or thousands, of pounds per square inch. Consequently, the discharge pipe 16 may be structured to withstand the relatively high static pressure force, and the silencer 18 of the compressor system 100 may be structured to withstand the stresses imposed by the dynamic pressure only. The silencer 18 need not be structured to withstand the static or total pressures generated by the compressor 12. Thus, the silencer 18 may be manufactured separately from the compressor system 100 as an integral part and retrofit to a previously manufactured compressor system with a discharge pipe, in keeping with the description of FIG. 4. The silencer 18 may be integral in that forms a part separate from the discharge pipe 16 in which it is installed. Moreover, the cost of manufacturing the silencer 18 and the compressor system 100 may be reduced relative to conventional compressor systems having conventional noise dampening features.

In such an embodiment, the silencer 18 may be inserted, slid, slipped, or otherwise installed into the discharge pipe 16. The silencer 18 can be secured in location within the discharge pipe 16 using any suitable mechanical, chemical, or metallurgical technique. By way of non-limiting example, the silencer 18 may be bonded within the discharge pipe 16 using an adhesive, such as an epoxy. Alternatively, the silencer 18 could be welded or brazed where compatible with materials being joined. In further examples, the silencer 18 may be staked, crimped, or trapped within the discharge pipe 16. In at least one embodiment, the silencer 18 is manufactured such that it is secured within the discharge pipe 16 by interference fit.

The silencer 18 may be formed from multiple annular rings 20 assembled, stacked, and/or affixed together by any suitable means. One or more annular rings 20 assembled together may be considered a cartridge that can be inserted or installed into the discharge pipe 16. Further, the silencer 18 can be considered to be a cartridge that is slid into the discharge pipe 16. Moreover, more than one cartridge may be separately inserted into the discharge pipe 16 to form the silencer 18.

In at least one embodiment, as shown in FIG. 4, the silencer 18 may be formed as an integral, unitary device having an outer wall separate from the discharge pipe 16. Alternatively, the silencer 18 may be formed such that each annular ring 20 may include the neck 42, orifice 40, the side walls defining the cavity 46 but excluding the outer wall. In such an embodiment, the discharge pipe 16 may provide the outer wall of each cavity 46 when the silencer 18 is inserted and secured in the discharge pipe 16. Unlike the depiction in FIG. 4, such an embodiment does not have a double wall composed of the discharge pipe wall and the silencer wall. Such an embodiment further reduces cost and complexity of manufacturing the silencer 18.

The silencer 18 may be manufactured by any suitable process. However, given the intricate features of the annular ring 20, it may or may not be possible to manufacture the silencer 18 by conventional molding, casting, or machining methods. In at least one embodiment according to the present disclosure, the silencer 18 and/or the annular ring 20 may be manufactured using an additive manufacturing process. Additive manufacturing is the process of forming an article by the selective fusion, sintering, or polymerization of a material stock. Additive manufacturing includes the use of a discretized computer-aided design ("CAD") data model of a desired part to define layers that may be processed successively in sequence to form the final integrated part. Additive manufacturing includes powder bed fusion ("PBF") and powder spray fusion ("PSF") manufacturing processes, including selective laser melting ("SLM"), direct metal laser sintering ("DMLS"), selective laser sintering ("SLS"), and electron beam melting ("EBM"). PBF and PSF processes share a basic set of process steps, including one or more thermal sources to induce melting and fusing between powder particles of a material stock, a means for controlling fusion of the powder particles within prescribed regions of each layer of the discretized CAD model, and a means of depositing the powder particles on the previously fused layers forming the part-in-process. The prescribed regions of each layer are defined by the cross-section of the part CAD model in a given layer. Because the powder particles are melted and fused to the previous layer, the resultant part may be solid, substantially fully dense, substantially void-free, and has substantially equivalent or superior thermal and mechanically properties of a part manufactured by conventional molding, casting, or machining methods. Alternatively, the resultant part may include a desired degree of porosity by appropriate control of the manufacturing process. Alternatively, the silencer 18 and/or the annular ring 20 may be formed by a suitable casting technique, such as investment casting.

Embodiments of the present invention include a compressor system, comprising: a compressor configured to discharge pressurized air; a discharge pipe in fluid communication with the compressor, wherein the discharge pipe is configured to conduct the pressurized air toward a desired location; and an annular ring inserted in the discharge pipe, wherein the annular ring has an internal passage configured to conduct the pressurized air from the compressor therethrough, wherein the annular ring includes a resonator in fluid communication with the internal passage; and wherein the resonator is configured to reduce pressure fluctuations in the pressurized air discharged by the compressor.

In a refinement, the annular ring is an integral, unitary structure and is separate from and supported by the discharge pipe.

In another refinement, the annular ring includes a plurality of resonators circumferentially spaced apart about the annular ring.

In yet another refinement, the resonator includes a cavity having a volume and an area; wherein the resonator includes a neck having a length and an orifice size; and wherein the cavity is in fluid communication with the internal passage via the neck.

In still another refinement, the resonator is tuned to attenuate a desired frequency by varying one or more of the volume, the area, the length and the orifice size.

In yet still another refinement, the annular ring includes a first circumferential row of resonators circumferentially spaced apart about the annular ring.

In a further refinement, each resonator in the first circumferential row of resonators is tuned to attenuate acoustic waves the same frequency.

In a yet further refinement, the annular ring includes a second circumferential row of resonators circumferentially spaced apart about the annular ring.

In a still further refinement, the resonators of the first circumferential row of resonators are tuned to attenuate one or more different frequencies than the resonators of the second circumferential row of resonators.

In a yet still further refinement, each resonator of the first circumferential row of resonators is tuned to attenuate a first frequency; and wherein each resonator of the second circumferential row of resonators is tuned to attenuate a second frequency different from the first frequency.

In another refinement, the second circumferential row of resonators is positioned adjacent to the first circumferential row of resonators.

In still another refinement, the annular ring includes a third circumferential row of resonators circumferentially spaced apart about the annular ring.

Embodiments of the present invention further include a compressor system, comprising: a screw compressor; a screw compressor discharge pipe having an outer surface and an internal passage disposed radially inward of the outer surface, wherein the internal passage configured to conduct pressurized air discharged from the screw compressor therethrough; and a plurality of resonators inserted between the outer surface and the internal passage, wherein each resonator includes an opening in fluid communication with the internal passage; and wherein each resonator is configured to attenuate acoustic pressure waves at a predetermined frequency.

In another refinement, the plurality of resonators are arranged in a plurality of circumferential rows of resonators circumferentially spaced apart.

In yet another refinement, at least one circumferential row of resonators is structured to attenuate acoustic pressure waves at a different frequency than at least one other circumferential row of resonators.

In still another refinement, the plurality of resonators are formed as part of an integral, unitary structure.

In yet still another refinement, the plurality of resonators are formed as part of an integral, unitary annular ring defined between the internal passage and the outer surface.

In another refinement, the annular ring is formed by an additive manufacturing process.

Embodiments of the present invention further include a compressor system, comprising: a compressor operative to discharge pressurized air having acoustic pressure waves therein; a discharge pipe in fluid communication with the compressor, wherein the discharge pipe is configured to conduct the pressurized air toward a desired location; and means for reducing amplitudes of the acoustic pressure waves at one or more preselected frequencies, wherein the means of reducing amplitudes is disposed within the discharge pipe.

In a refinement, the means for reducing is formed as an integral, unitary structure having a plurality of Helmholtz resonators.

While the invention has been described in connection with particular embodiments, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A compressor system, comprising:
    a compressor structured to discharge a flow of pressurized gas;
    a discharge pipe in fluid communication with the compressor, wherein the discharge pipe is structured to conduct the pressurized gas toward a desired location; and
    an annular ring inserted into the discharge pipe, wherein the annular ring has an internal passage structured to conduct the pressurized gas from the compressor therethrough,
    wherein the annular ring includes a resonator in fluid communication with the internal passage,
    wherein the resonator is configured to reduce pressure fluctuations in the flow of pressurized gas discharged by the compressor,
    wherein the resonator includes a cavity, having a volume and an area, and a neck having a length and an orifice size, and wherein the cavity is in fluid communication with the internal passage via the neck; and
    wherein the neck extends opposite the internal passage from a surface adjacent the internal passage.

2. The compressor system of claim 1, wherein the annular ring is an integral structure and is separate from and supported by the discharge pipe.

3. The compressor system of claim 1, wherein the annular ring includes a plurality of resonators circumferentially spaced apart about the annular ring.

4. The compressor system of claim 1, wherein the resonator is tuned to attenuate a desired frequency by varying one or more of the volume, the area, the length and the orifice size.

5. The compressor system of claim 1, wherein the annular ring includes a first circumferential row of resonators circumferentially spaced apart about the annular ring.

6. The compressor system of claim 5, wherein each resonator in the first circumferential row of resonators is tuned to attenuate acoustic waves of the same frequency.

7. The compressor system of claim 5, wherein the annular ring includes a second circumferential row of resonators circumferentially spaced apart about the annular ring.

8. The compressor system of claim 7, wherein the resonators of the first circumferential row of resonators are tuned to attenuate one or more different frequencies than the resonators of the second circumferential row of resonators.

9. The compressor system of claim 7, wherein each resonator of the first circumferential row of resonators is tuned to attenuate a first frequency, and wherein each resonator of the second circumferential row of resonators is tuned to attenuate a second frequency different from the first frequency.

10. The compressor system of claim 7, wherein the second circumferential row of resonators is positioned adjacent to the first circumferential row of resonators.

11. The compressor system of claim 7, wherein the annular ring includes a third circumferential row of resonators circumferentially spaced apart about the annular ring.

12. A compressor system, comprising:
    a screw compressor;
    a screw compressor discharge pipe having an outer surface and an internal passage disposed radially within the outer surface, wherein the internal passage is structured to conduct pressurized air discharged from the screw compressor therethrough; and
    a plurality of resonators inserted between the outer surface and the internal passage, wherein each resonator includes an opening in fluid communication with the internal passage, wherein each resonator is structured to attenuate acoustic pressure waves at a predetermined frequency, the plurality of resonators include a cavity, having a volume and an area, and a neck having a length and an orifice size, and wherein the cavity is in fluid communication with the internal passage via the neck, and wherein the neck extends opposite the internal passage from a surface adjacent the internal passage.

13. The compressor system of claim 12, wherein the plurality of resonators are arranged in a plurality of circumferential rows of resonators circumferentially spaced apart.

14. The compressor system of claim 13, wherein at least one circumferential row of resonators is structured to attenuate acoustic pressure waves at a different frequency than at least one other circumferential row of resonators.

15. The compressor system of claim 13, wherein the plurality of resonators are formed as part of an integral structure and are separate from and supported by the discharge pipe.

16. The compressor system of claim 12, wherein the plurality of resonators are formed as part of an integral annular ring defined between the internal passage and the outer surface.

17. The compressor system of claim 16, wherein the annular ring is formed by an additive manufacturing process.

18. A compressor system, comprising:
a compressor operative to discharge pressurized air having acoustic pressure waves therein;
a discharge pipe in fluid communication with the compressor, wherein the discharge pipe is configured to conduct the pressurized air toward a desired location; and
one or more resonators structured to reduce amplitudes of the acoustic pressure waves at one or more preselected frequencies, the one or more resonators disposed within the discharge pipe, the one or more resonators including a cavity, having a volume and an area, and a neck having a length and an orifice size, wherein the cavity is in fluid communication with an internal passage of the discharge pipe via the neck, and wherein the neck extends opposite the internal passage from a surface adjacent the internal passage.

19. The compressor system of claim 18, wherein the one or more resonators are formed as part of an integral structure and are separate from and supported by the discharge pipe.

* * * * *